US011746833B2

(12) United States Patent
Yoon (10) Patent No.: US 11,746,833 B2
(45) Date of Patent: *Sep. 5, 2023

(54) CLUTCH ASSEMBLY STRUCTURE

(71) Applicant: AUTODYN SYS INC., Incheon (KR)

(72) Inventor: Jongyun Yoon, Incheon (KR)

(73) Assignee: AUTODYN SYS INC., Incheon (KR)

( * ) Notice: Subject to any disclaimer, the term of this patent is extended or adjusted under 35 U.S.C. 154(b) by 118 days.

This patent is subject to a terminal disclaimer.

(21) Appl. No.: 17/430,527

(22) PCT Filed: Jul. 20, 2020

(86) PCT No.: PCT/KR2020/009541
§ 371 (c)(1),
(2) Date: Aug. 12, 2021

(87) PCT Pub. No.: WO2021/071066
PCT Pub. Date: Apr. 15, 2021

(65) Prior Publication Data
US 2022/0128104 A1   Apr. 28, 2022

(30) Foreign Application Priority Data

Oct. 7, 2019  (KR) .......................... 10-2019-0124043
Mar. 23, 2020 (KR) .......................... 10-2020-0034811

(51) Int. Cl.
*F16D 15/00* (2006.01)
*F16D 41/066* (2006.01)
*F16D 23/12* (2006.01)

(52) U.S. Cl.
CPC ............. *F16D 15/00* (2013.01); *F16D 23/12* (2013.01); *F16D 41/066* (2013.01); *F16D 2023/123* (2013.01)

(58) Field of Classification Search
CPC .... F16D 15/00; F16D 23/12; F16D 2023/123; F16D 41/066; F16D 2041/0646; F16D 41/086; B60K 17/02; B60K 23/02; B60K 23/06
USPC .................................................. 477/171, 172
See application file for complete search history.

(56) References Cited

U.S. PATENT DOCUMENTS

| 2,065,980 | A | * | 12/1936 | Maybach | ............... | B60W 10/02 |
| | | | | | | 192/85.48 |
| 2,567,043 | A | * | 9/1951 | Wemp | ............... | B60W 30/1819 |
| | | | | | | 477/80 |
| 4,084,672 | A | * | 4/1978 | Avins | ..................... | B60K 23/06 |
| | | | | | | 477/171 |
| 10,012,274 | B2 | | 7/2018 | Jo et al. | | |
| 11,542,991 | B2 | * | 1/2023 | Yoon | ....................... | F16D 15/00 |
| 2018/0135706 | A1 | | 5/2018 | Stoltze et al. | | |

FOREIGN PATENT DOCUMENTS

| JP | 2008-224025 A | 9/2008 |
| JP | 2016-156440 A | 9/2016 |
| KR | 10-1916551 B1 | 11/2018 |

* cited by examiner

*Primary Examiner* — Richard M Lorence
(74) *Attorney, Agent, or Firm* — KORUS Patent, LLC; Seong Il Jeong (57) ABSTRACT

The clutch assembly of the clutch system according to the present invention can precisely transmit or cut off power from an engine to a transmission by pressing and releasing of an accelerator pedal and a brake pedal.

6 Claims, 10 Drawing Sheets

CLUTCH ASSEMBLY STRUCTURE

FIELD OF THE INVENTION

Applicant of the present invention suggested a clutch assembly in Korean Application No. 10-2019-0124043 filed on Oct. 7, 2019, which comprises: a rotating plate connected to a revolving shaft of an engine and rotating, a plurality of guides protruding on a rim of the rotating plate and having semicircular shapes, and a rotating member located on a cam-disk and an outer circumference of the cam-disk. This clutch assembly is applied to a clutch system comprising a power transmission device interlocking with an accelerator, which is disclosed in Korean Application No. 10-2019-0166488, filed on Dec. 13, 2019.

The present invention relates to a clutch assembly, which is an improvement of Korean Application No. 10-2019-0124043.

BACKGROUND OF THE INVENTION

The wheels of the vehicle rotate in such way that rotations of the engine are changed in the transmission through the flywheel and clutch discs, and transmitted to the main shaft.

In case of manual transmission vehicles, the connection or disconnection of the flywheel and disc is achieved by the clutch pedal installed on the upper floor of the left side of the driver's seat. When the clutch pedal is pressed, the connection between the two members is cut off; when the pedal is released, the two member are connected. When the driver presses the clutch pedal, shifts the gear in a state of pressing the clutch, and then slowly takes the foot off the pedal, the vehicle becomes in a state of a semi-clutch, which is about to come into contact between the flywheel and disk.

In case of automatic transmission vehicles, the vehicles do not have a clutch pedal, and are driven by detecting rotations of the engine, speed of the vehicle, and automatically shifting the transmission depending on the vehicle loads. The vehicle consists of the torque converter, the oil pump, the hydraulic clutch, the planetary gear set, the rotary sensor, the deceleration gear, and the valve body. The transmission part consists of a combination of the planetary gear set, the wet multi-plate clutches, and the brake.

Manual and automatic transmission vehicles have developed by imitating strengths of each other. For example, manual transmission vehicles have adopted the automatic control algorithms of the automatic transmission; automatic transmission vehicles have partially adopted the mechanical friction clutch of the manual transmission for improving fuel efficiency. However, the design structures of the manual and automatic transmission vehicles have retained the first developed platforms, respectively.

In case of automatic transmission vehicles, they have to be switched in conjunction with the clutch pedal at the same time; thus, there is a low preference in South Korea and North America due to slipping when re-starting on ramps. Accordingly, it is necessary to develop a system that enables transmission without a clutch pedal and that prevents slipping on ramps.

In case of automatic transmission vehicles, they have a low fuel efficiency due to the torque transmission through fluid, and are vulnerable to a torque short that is transferred into the transmission from the engine in the abnormal event such as a sudden unintended acceleration. Accordingly, it is necessary to develop a system that eliminates possibilities of a sudden unintended acceleration by mechanically operating states of acceleration, semi-clutch, and stop.

DETAILED DESCRIPTION OF THE INVENTION

Technical Problems

Accordingly, the present invention is suggested to provide a clutch assembly applied to a novel clutch system, which ensures a 100% torque transmission rate between an engine and a transmission in a vehicle system and can be commonly applied to conventional manual transmission and automatic devices.

SUMMARY OF THE INVENTION

To solve the problems mentioned above, the present invention provides 1. A clutch assembly comprising: an out-cam interlocking with an accelerator pedal and a brake pedal of a vehicle and rotating in one direction or the other direction; an in-cam rotating according to rotation of an engine of the vehicle; rotary members contacted with the out-cam and selectively contacted with the in-cam by moving in a height direction according to rotation in one direction or the other direction of the out-cam, and a forked part supporting the rotary member and rotating in conjunction with the rotary member, wherein a rotational force of the engine is sequentially transmitted through the in-cam, the rotary member, and the forked part.

The forked part includes a pair of forked plates facing each other, and the rotary members are installed to be supported in a space between the forked plates at equal intervals, wherein the in-cam is a disk with a diameter that is smaller than that of the forked part, and the out-cam is a disk with a diameter that is larger than that of the forked part, wherein the out-cam and the in-cam are installed in an empty space between the forked plates.

The out-cam has a rim formed on an outer circumference thereof, and the rim has curved receptive surfaces that are formed on an inner side thereof and that receive the rotary members.

The in-cam has curved convex surfaces protruding outward on an outer circumference thereof, and the curved convex surfaces are formed corresponding to the rotary member.

On the outer circumference of the forked plate, concave curved parts are formed at regular intervals, and connection parts connect between the concave curved parts, wherein on both sides of the connection part, forks are installed, and the rotary member is contacted with and supported by both sides of the forks.

According to rotation in one direction or the other direction of the out-cam, the rotary members are received in the receptive surfaces, or escaped from the receptive surfaces and placed on flat surfaces of the inner side of the rim, thereby changing locations of the rotary members in the height direction, wherein according to the change of the locations of the rotary members in the height direction, the rotary members are either in a state of contact with the convex surfaces or in a state of separation from the convex surfaces.

Technical Effects of the Invention

The clutch assembly of the clutch system of the present invention can expand the base of manual transmission vehicles with simplified transmission, and enables accurate and permanent uses by interlocking with the accelerator and brake pedal.

In addition, the clutch assembly of the present invention mechanically operates power transmission, thereby preventing sudden unintended acceleration and enabling protection of both drivers and pedestrians.

Furthermore, the clutch assembly of the present invention can be applied to all vehicles. In case of hybrid cars, the clutch system can replace the main component that transmits power generated from the internal combustion engines at the point that the internal combustion engine operates. In addition, the clutch assembly can be applied to the components that require power transmission in a large system such as electric vehicles and other power plants, which uses the internal combustion engines.

DETAILED DESCRIPTION EMBODIMENTS OF THE INVENTIONS

Hereafter, the present invention will be described in detail in conjunction with the accompanying drawings. All terms used in the specification and claims may not be limited to be interpreted as definitions in a generally-used dictionary, and may be defined according to the inventive concept of the present invention. The embodiments in the specification and structures shown in drawings are embodiments of the present invention, and are not restricting or limiting the scopes of the inventive concepts of the present invention.

Figure 1:
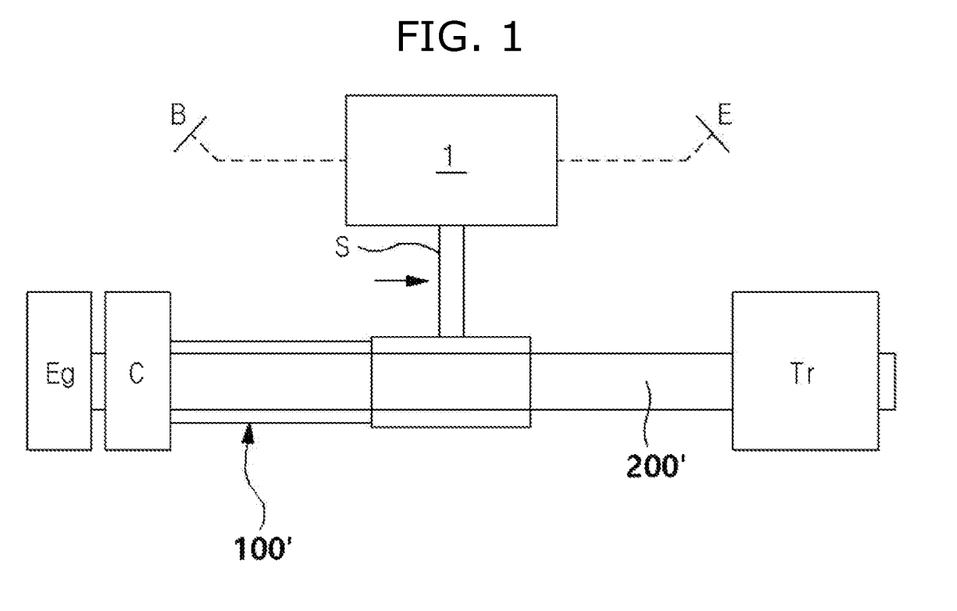
FIG. 1 is a schematic drawing of a clutch system of the present invention.

FIG. 1 is a schematic drawing of a clutch system of the present invention.

The clutch system comprises an engine Eg, and a clutch assembly C connected or disconnected to the engine Eg. An input shaft 200' connects between the clutch assembly C and a transmission Tr. The configurations and functions of the engine Eg, the transmission Tr, and the input shaft 200' have been already disclosed; however, any of the conventional or newly developed ones can be used.

The location and state of the clutch assembly C are changed by pressing or releasing an accelerator pedal E, or pressing or releasing a brake pedal B. A power transmission device 1 and a driving shaft 100' are provided to transmit a state of pressing or releasing of the accelerator pedal and the brake pedal E, B to the clutch assembly C. The power transmission device 1 and the driving shaft 100' are connected to each other through a connection member S such as rod. The operation of the power transmission device 1 is transmitted to the driving shaft 100', and the operation of the driving shaft 100' is transmitted to the clutch assembly C. The driving shaft 100' is not connected to the transmission Tr. One side of the power transmission device 1 interlocks with the accelerator pedal E through a certain part, a cable for example, and the other side of the power transmission device 1 interlocks with the brake pedal B.

Figure 2:
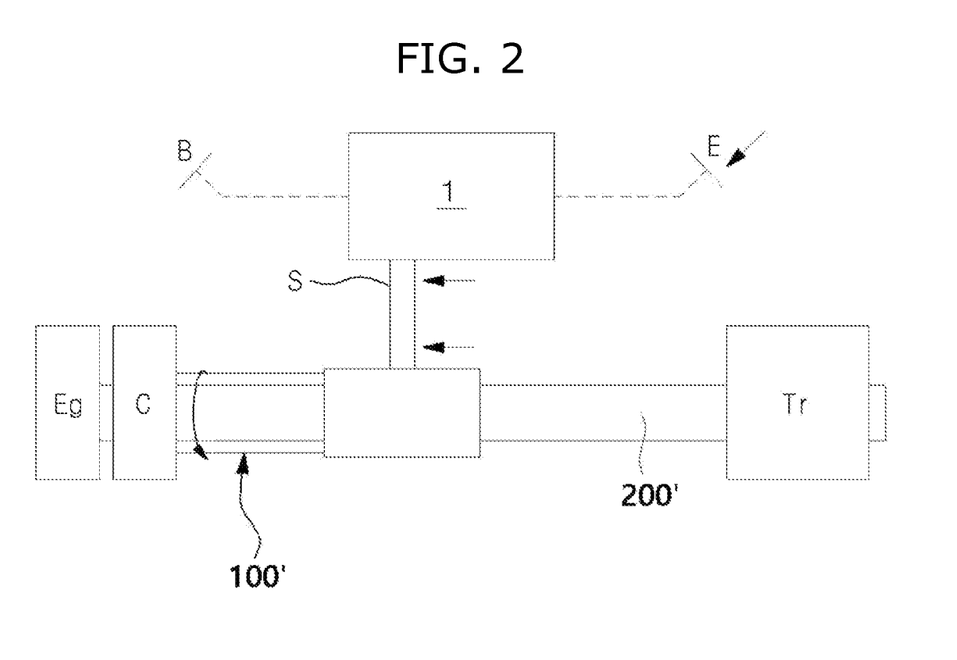
FIG. 2 is a schematic drawing of the clutch system when a driver presses an accelerator pedal.

FIG. 2 is a schematic drawing of the clutch system when the driver presses the accelerator pedal E.

When the driver presses the accelerator pedal E, the connection member S linearly moves to a first direction of FIG. 2, to the left side for example, according to the operation of the power transmission device 1. Then, the driving shaft 100' linearly moves to the left side, and the linear motion of the driving shaft 100' is converted to rotary motion of the clutch assembly C. Accordingly, the clutch assembly C transitions to "a first state". In the first state, the clutch assembly C transmits the rotational force of the engine Eg to the transmission Tr through the input shaft 200'. When the driver keeps pressing the accelerator pedal E, the increased rotational force of the engine Eg is transmitted to the transmission Tr, and the clutch assembly C maintains the first state.

Figure 3:
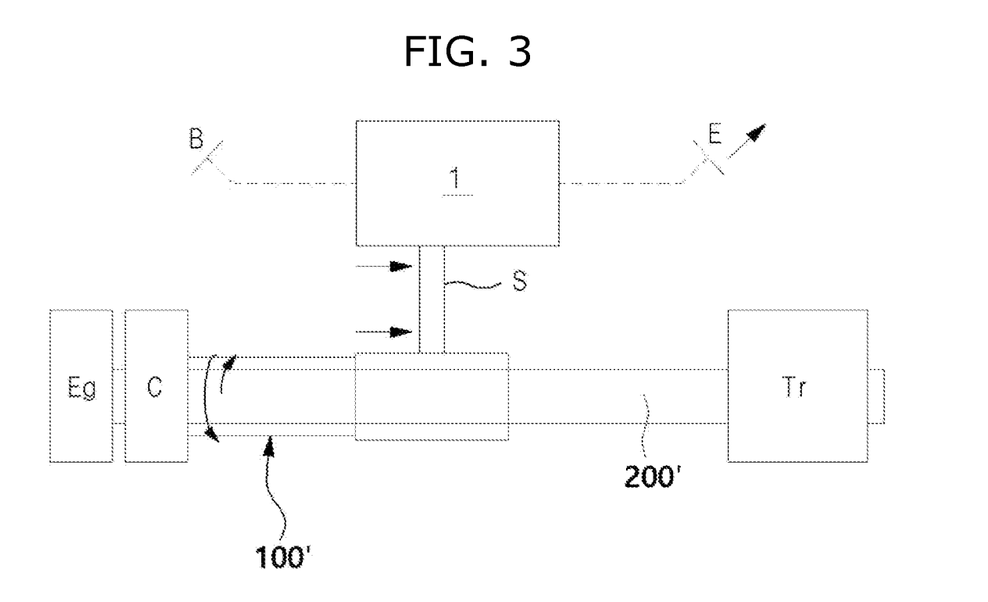
FIG. 3 is a schematic drawing of the clutch system when the driver releases the accelerator pedal from the state shown in FIG. 2.

FIG. 3 is a schematic drawing of the clutch system when the driver releases the accelerator pedal E from the state shown in FIG. 2.

When the driver releases the accelerator pedal E, the connection member S linearly moves a bit to a second direction of FIG. 3, to the right side for example, according to the operation of the power transmission device 1. Then, the driving shaft 100' linearly moves a bit to the right side, and the linear motion of the driving shaft 100' is converted to rotary motion of the clutch assembly C, which rotates in an opposite direction to a direction that the clutch assembly C rotates in FIG. 2. In this instance, the location of the clutch assembly C is different from that in the first state; however, "a second state", in which the clutch assembly C transmits the rotational force of the engine Eg to the transmission Tr through the input shaft 200', keeps the same.

In general, the clutch has a function of connecting between the engine and the transmission when the accelerator pedal E is either pressed or released. In this respect, the functions of clutch assembly C in FIGS. 2 and 3 may be essentially the same.

Figure 4:
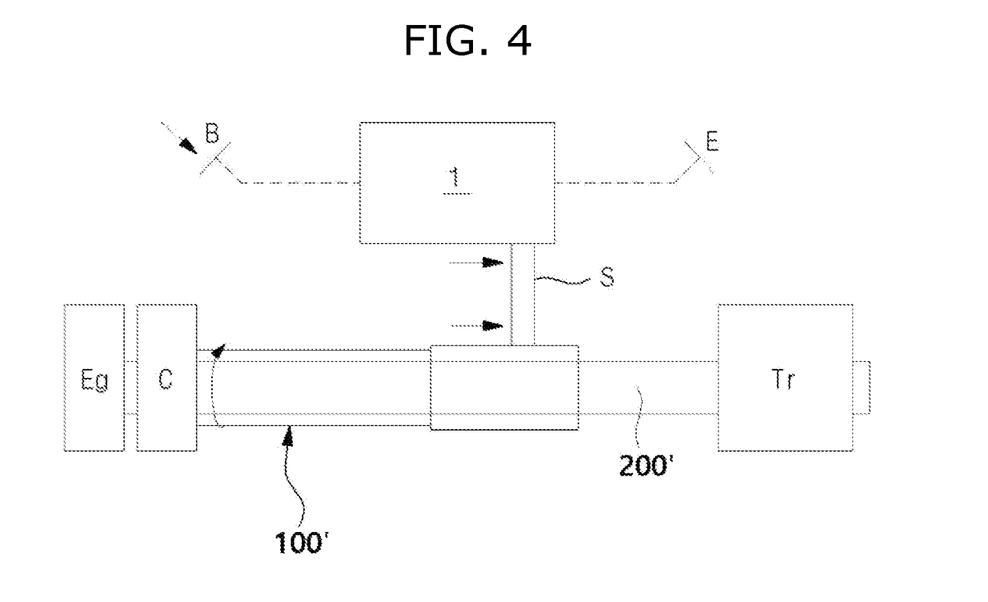
FIG. 4 is a schematic drawing of the clutch system when the driver presses the brake pedal from the state shown in FIG. 3, the state that the driver releases the accelerator pedal.

FIG. 4 is a schematic drawing of the clutch system when the driver presses the brake pedal B from the state shown in FIG. 3. The state shown in FIG. 3 refers to when the driver releases the accelerator pedal E.

When the driver presses the brake pedal B, the connection member S linearly moves to the second direction of FIG. 4, to the right side for example, according to the operation of the power transmission device 1. Then, the driving shaft 100' linearly moves to the right side, and the linear motion of the driving shaft 100' is converted to rotary motion of the clutch assembly C, which rotates in an opposite direction to the direction shown in FIG. 2. In this instance, the clutch assembly C transitions to "a third state". In the third state, the clutch assembly C cuts off the connection between the engine Eg and the input shaft 200', and does not transmit power to the transmission Tr. The difference from the state shown in FIG. 3 is that the connection member S of the power transmission device 1 moves further to the right side. The clutch assembly C rotates further to the same direction as shown in FIG. 3, and transitions to the definite cut-off state, in which the rotational force of the engine Eg is not transmitted to the input shaft 200'.

Figure 5:
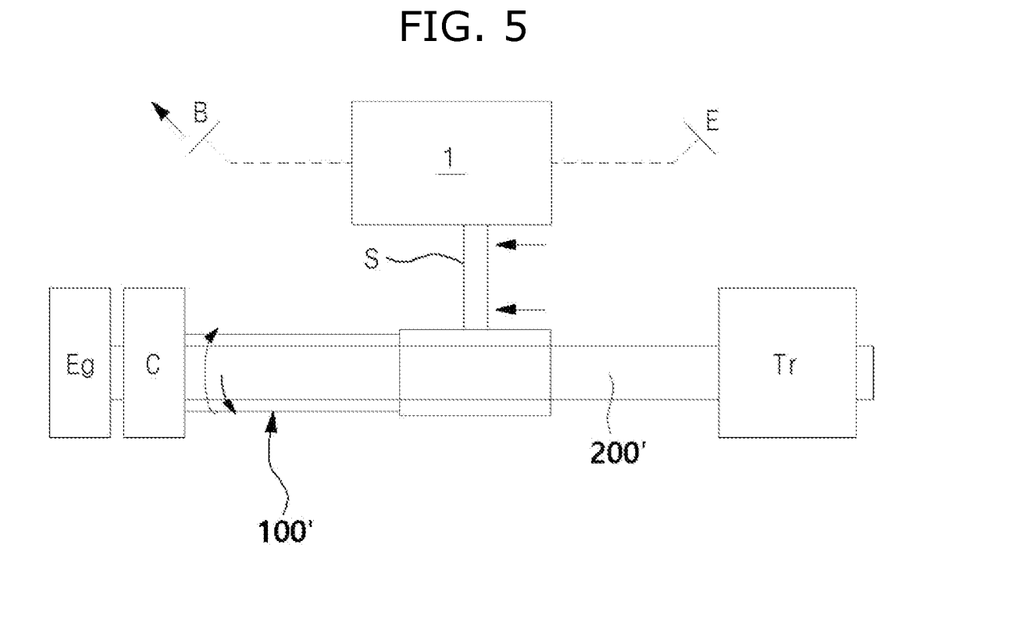
FIG. 5 is a schematic drawing of the clutch system when the driver releases the brake pedal from the state shown in FIG. 4, the state that the driver presses the brake pedal.

FIG. 5 is a schematic drawing of the clutch system when the driver releases the brake pedal B from the state shown in FIG. 4. The state shown in FIG. 4 refers to when the driver presses the brake pedal B.

When the driver releases the brake pedal B, the connection member S linearly moves a bit to the first direction of FIG. 2, to the left side for example, according to the operation of the power transmission device 1. Then, the driving shaft 100' linearly moves a bit to the left side, and the linear motion of the driving shaft 100' is converted to rotary motion of the clutch assembly C in the same direction as the direction shown in FIG. 2. In this instance, the clutch assembly C is converted to "a fourth state", a so-called semi-clutch state, in which the flywheel of the engine Eg is about to come into contact with disk. The term "semi-clutch state" in the present invention is used to indicate an initial, unstable state of transmission from a rotational force of the engine Eg to the transmission Tr. Even though the term "semi-clutch state" in the present invention uses the same word "semi-clutch state" referring to a state, in which a clutch pedal in a manual vehicle is released, the "semi-clutch state" in the present invention is fundamentally different from that in manual vehicles in that the brake pedal B is released in the "semi-clutch state" in the present invention. Hereafter, "semi-clutch state" will be referred to as a transition state or an intermediate state.

To drive the vehicle, the driver starts the vehicle, pressing the brake pedal B, and presses the accelerator pedal E after releasing the brake pedal B. In this case, the states of the clutch system sequentially transition as shown in FIGS. 4, 5, and 2. In other words, the clutch system sequentially transitions to the state of a cut-off between the engine Eg and the transmission Tr; a state of an initial power transmission, a semi-clutch state or transition state; and a state of a power connection between the engine Eg and the transmission Tr. When the driver repetitively presses and the releases the accelerator pedal E and the brake pedal B while driving, the clutch system also transitions to any one state of FIGS. 2 to 5 or keeps the previous state. The clutch system can eliminate a clutch pedal of a manual vehicle, and can be applied to all kind of vehicles including manual and automatic vehicles.

The clutch assembly described below can be employed in any structure that can transmit or clamp power, interlocking with the accelerator pedal E and the brake pedal B. Accordingly, embodiments shown in FIG. 6 are provided for explanation, and are not restricting or limiting the scopes of the inventive concepts of the present invention.

Figure 6:
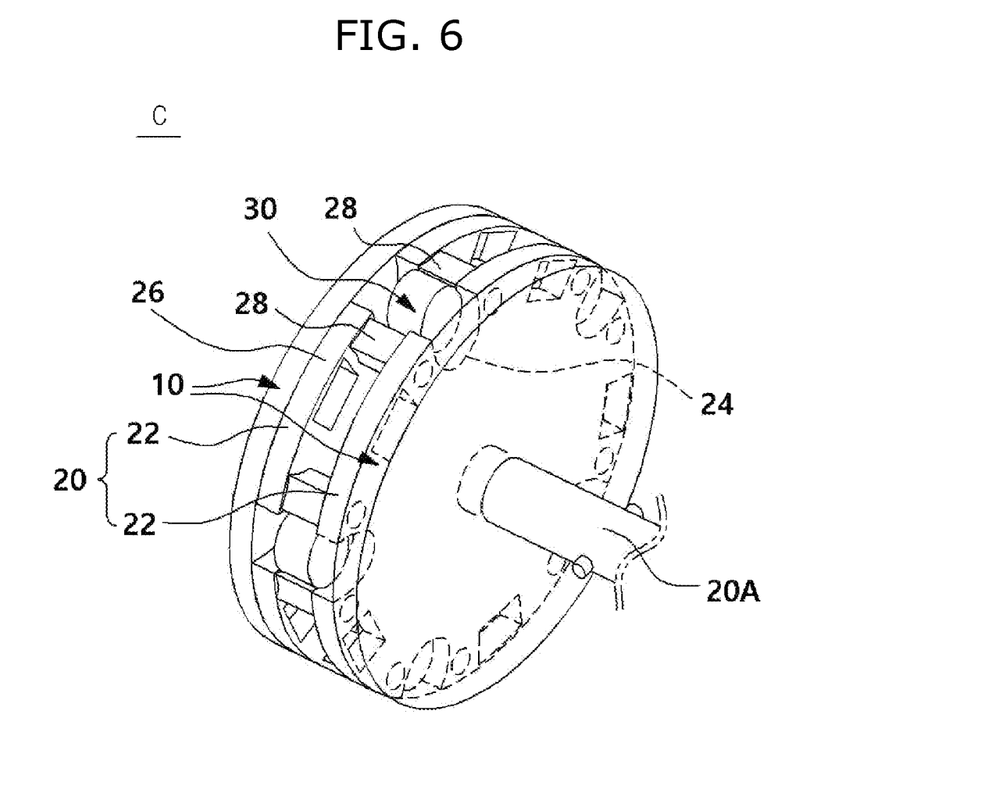
FIG. 6 is a perspective view of rims and a forked part included in a clutch assembly of the present invention. The rims form a frame of the clutch assembly, and the forked part is disposed between the rims.

FIG. 6 is a perspective view of rims 10 and a forked part 20 included in the clutch assembly C. The rims 10 form a frame of the clutch assembly C, and the forked part 20 is disposed between the rims 10.

The rims 10 consist of a pair of circular disks facing each other. The disks are joined together by tightening tools (not shown), and function as an integrated one body. The rims 10 act as a housing.

Figure 7:
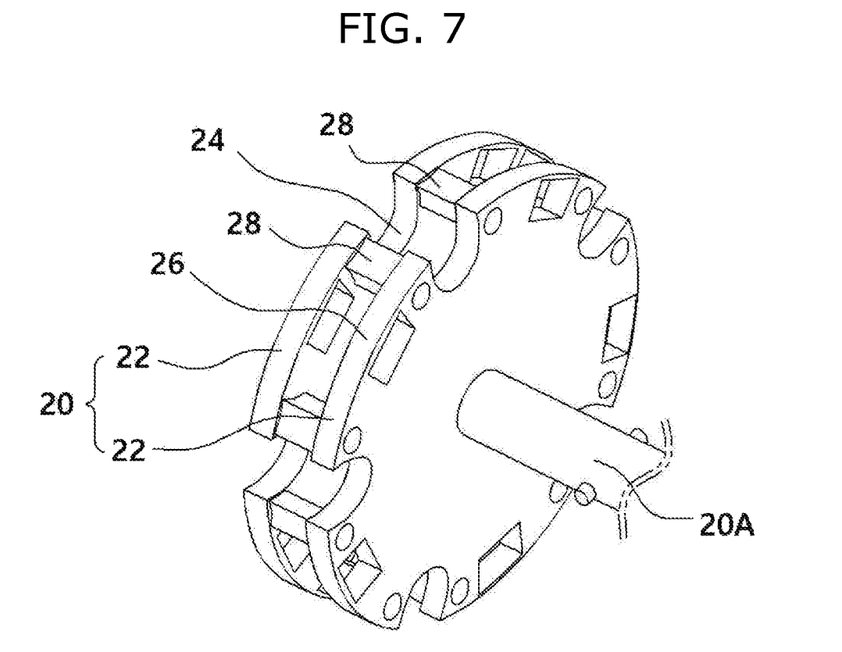
FIG. 7 is a drawing magnifying a portion of FIG. 6.

As illustrated in FIG. 7, the forked part 20 includes forked plates 22, a pair of approximately circular discs facing each other. On the outer circumference of the forked plate 22, concave curved parts 24, having five concaves for example, are formed at regular intervals, and the connection parts 26 connect between the concave curved parts 24. Forks 28 are installed on both sides of the connection part 26. Between the forks 28 facing each other between two connection parts 26, a rotary member 30, such as a needle bearing, is installed.

The rotary member 30 meets with the forks 28 in both sides. In other words, the forks 28 have a function of supporting the rotary member 30. The rotary member 30 is an independent element from the forked part 20. The rotary member 30 is mounted on the concave curved part 24, and clipped by the forks 28; accordingly, when the rotary member 30 rotates, the forked parts 20 also rotate. A rotary shaft 20A is formed in the center of the forked part 20, and the rotation of the rotary shaft 20A is transmitted to the transmission Tr.

This invention is characterized by installations of an in-cam 100 adjacent to the bottom of the rotary member 30 and an out-cam 200 adjacent to the top of the rotary member 30, in the empty space between a pair of forked plates 22.

Figure 8:
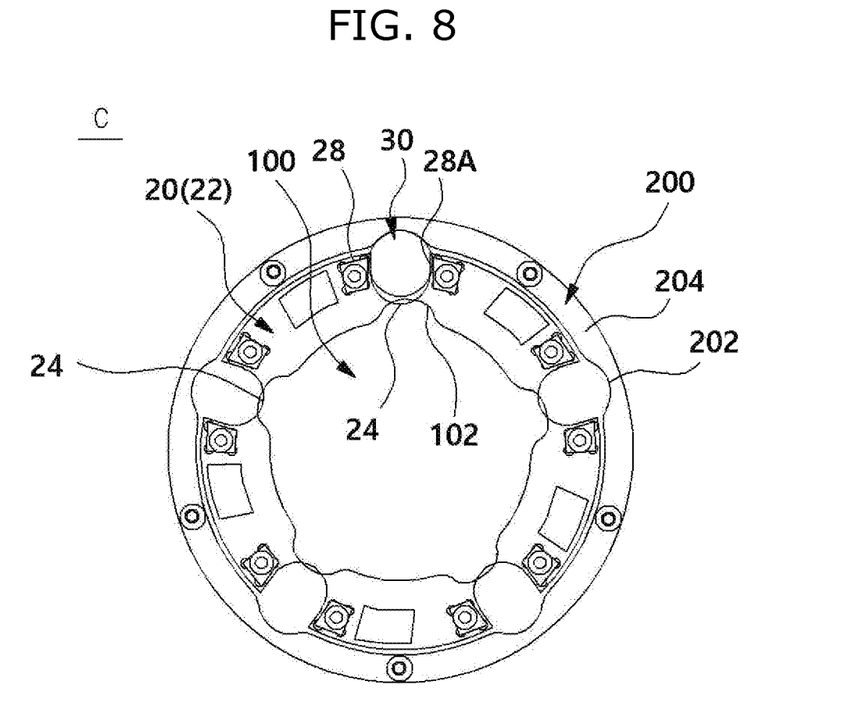
FIG. 8 is a cross-sectional view of the clutch assembly, cut in a space between forked plates of the forked part.

FIG. 8 is a cross-sectional view of the clutch assembly C, cut in a space between the forked plates 22.

The in-cam 100 has a pentagonal circular shape with a smaller diameter than that of the forked plate 22. The out-cam 200 is a circular disk shape with a larger diameter than that of the forked plate 22. The in-cam 100 and out-cam 200 are only connected by the rotary member 30, and are dynamically disconnected from each other. Therefore, even if any one of the in-cam 100 and out-cam 200 rotates, the other does not automatically rotate. Because the in-cam 100 and out-cam 200 are placed in the empty space between the forked plates 22, there is no collision or interference between the in-cam 100 and the forked plates 22, or between the out-cam 200 and the forked plates 22 when the in-cam 100 or out-cam 200 rotates. The in-cam 100 and out-cam 200 does not consist of double plates, such as the rim 10 or the forked part 20. Each of the in-cam 100 and out-cam 200 is a single plate with a certain thickness.

The in-cam 100 is connected to the rotary shaft of the engine Eg, which is not illustrated. Therefore, the in-cam 100 is a dependent member that rotates automatically according to the engine Eg. The in-cam 100 has curved convex surfaces 102, having five convex parts for example, on the outer circumference of the in-cam 100. The curved convex parts 102 protrude outward at equal intervals according to the number of the rotary members 30.

On the outer circumference of the out-cam 200, rims 204 are formed. On the inner side of the rim 204, five curved receptive surfaces 202 that are concave toward the outer surface of the rim 204 at equal intervals according to the number of rotary members 30. Each rotary member 30 is aligned to each convex surface 102 and receptive surface 202. In FIG. 8, although a single rotary member 30 is shown, five rotary members 30 are mounted on the clutch assembly C.

The out-cam 200 rotates clockwise or counterclockwise depending on pressing or releasing of the accelerator or brake pedal E,B. The driving shaft 100' is connected to the shaft of the out-cam 200, which is not illustrated, and the linear motion of the driving shaft 100' is converted into the rotational motion of the out-cam 200 through the shaft of the out-cam 200. Accordingly, the position of the rotary member 30 received in the receptive surfaces 202 is moved.

In FIG. 8, the rotary member 30 comes in contact with the apex of the receptive surfaces 202, and is fully received. Accordingly, the rotary member 30 is spaced apart from the convex surface 102 with a fine distance. Therefore, even if the engine Eg and the in-cam 100 rotate, the rotary member 30 and the forked part 20 supporting the rotary member 30 do not rotate, and a rotational force is not transmitted to the transmission Tr. In this respect, FIG. 8 illustrates the state of complete power disconnection by pressing the brake pedal B on the vehicle.

Figure 9:
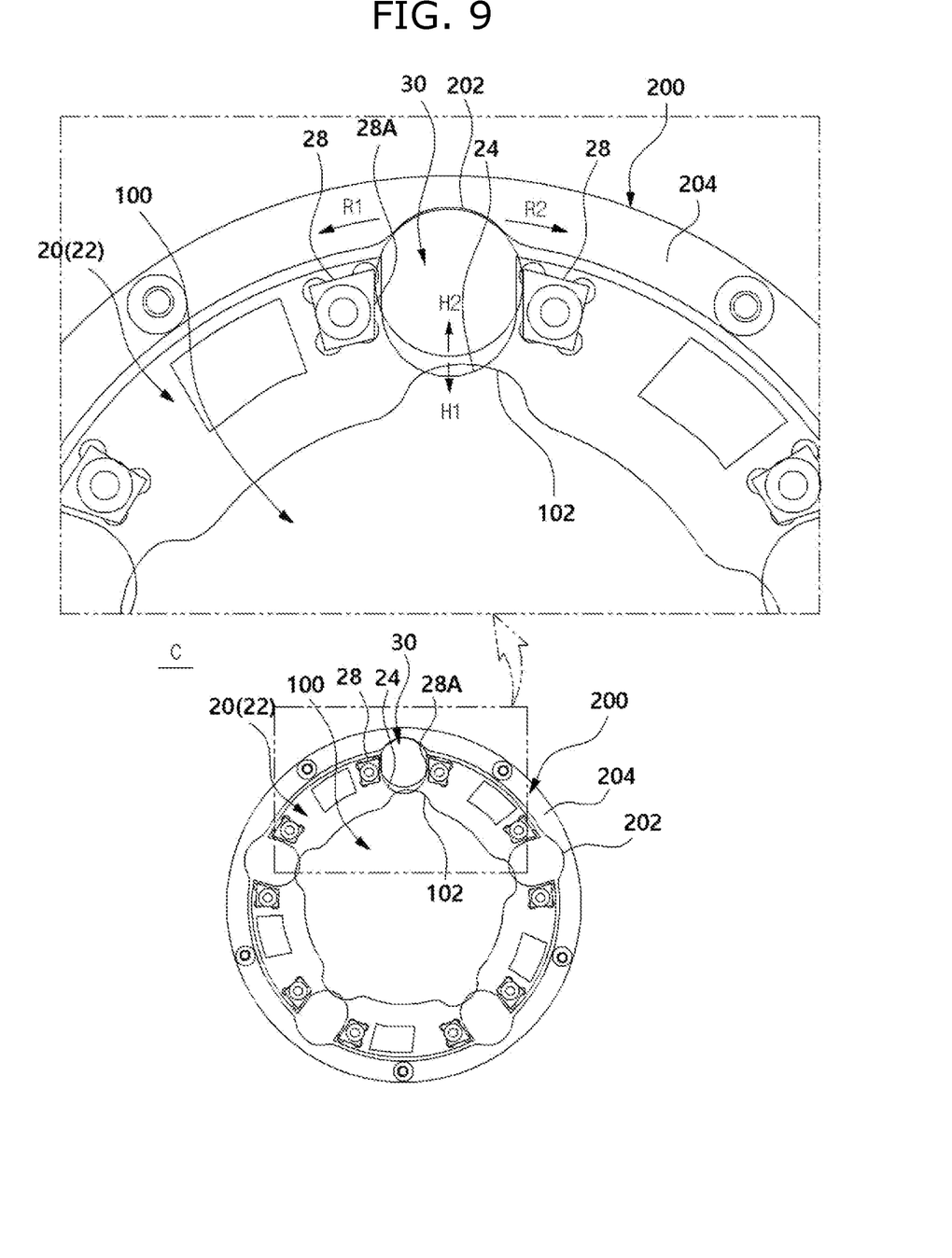
FIG. 9 is a drawing magnifying a portion of FIG. 8.

FIG. 9 is a drawing magnifying a portion of FIG. 8.

In the state of FIG. 9, when the out-cam 200 rotates counterclockwise R1, the receptive surfaces 202 rotate in the same direction. In this instance, the other points other than the apex of the receptive surfaces 202 forcibly push the rotary member 30 downward; accordingly, the rotary member 30 moves in a downward direction H1. Because the rotary member 30 is supported by the side 28A of the forks 28 as described above, and the forked part 20 does not rotate even if the out-cam 200 rotates, the rotary member 30 does not move in lateral directions. Thus, the motion of the rotary member 30 in the downward direction H1 follows a linear path close to the vertical line along the side 28A of the forks 28.

When the rotary member 30 moves downward, the rotary member 30 comes in contact with the convex surface 102 of the in-cam 100. Accordingly, when the engine Eg is driven and the in-cam 100 rotates, the rotary member 30 rotates according to the rotation of the convex surface 102. Therefore, the forked part 20 clipping the rotary member 30 also rotates, and the rotational force is transmitted to the transmission Tr through the rotary shaft 20A of the forked part 20. The out-cam 200 rotates according to the rotation of the rotary member 30 because the rim 204 of the out-cam 220 is always in contact with the rotary member 30.

Likewise, if the out-cam 200 rotates clockwise R2 from the state shown in FIG. 9, the principle explained above can be applicable.

Referring to the explanation described above, and FIGS. 10 to 13, the operations of the clutch assembly C of the present invention will be described. The operations can categorize into when the accelerator pedal E is pressed, when the accelerator pedal E is released, when the brake pedal B is pressed, and when the brake pedal B is released.

Figure 10:
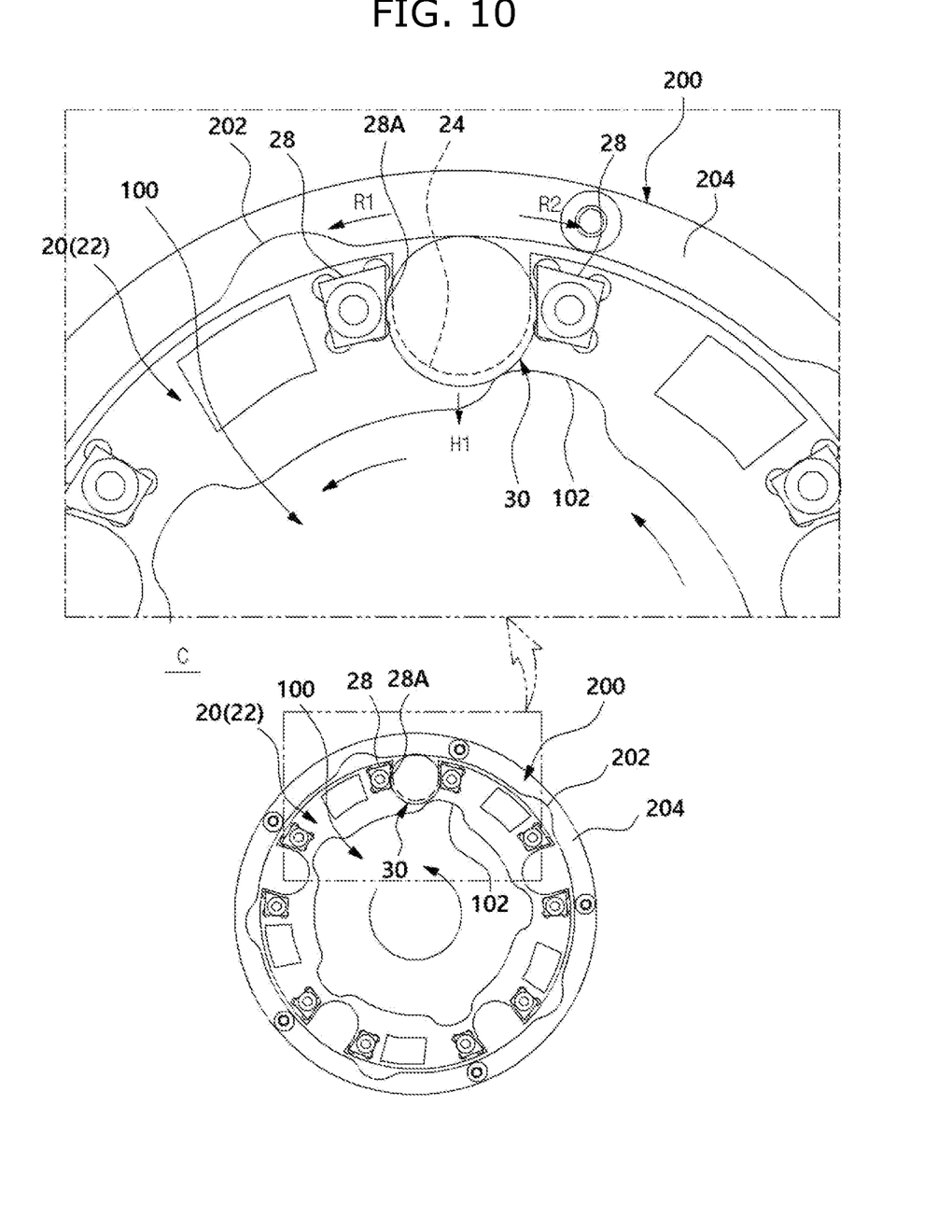
FIG. 10 is a drawing when the driver presses the accelerator pedal from the state shown in FIG. 8.

FIG. 10 is a drawing when the driver presses the accelerator pedal E from the state shown in FIG. 8. Assuming that the out-cam 200 rotates counterclockwise R1 according to accelerator pedal E, the result will be consistent as described in FIG. 9. Thus, as illustrated in FIG. 10, when the receptive surface 202 pushes the rotary member 30 down, the rotary member 30 are escaped from the receptive surface 202. Then, the flat surface of the inner rim 204 presses the rotary member 30. The rotary member 30 moves downward by the depth of the receiving surface 202, and comes in contact with the convex surface 102 of the in-cam 100. The rotational force of the in-cam 100, which is rotated by acceleration of the engine Eg, is transmitted to the forked part 20 through the rotary member 30, and the rotation of the forked part 20 is transmitted to the transmission Tr. In this instance, the out-cam 200 that is in contact with the rotary member 30 also rotates at the same time. When the accelerator pedal E is further pressed to the maximum, the out-cam 200 rotates counterclockwise R1 further. In this case, because the rotary member 30 and the in-cam 100 keep in constant contact with each other as shown in FIG. 10, there is no problem with power transmission.

Figure 11:
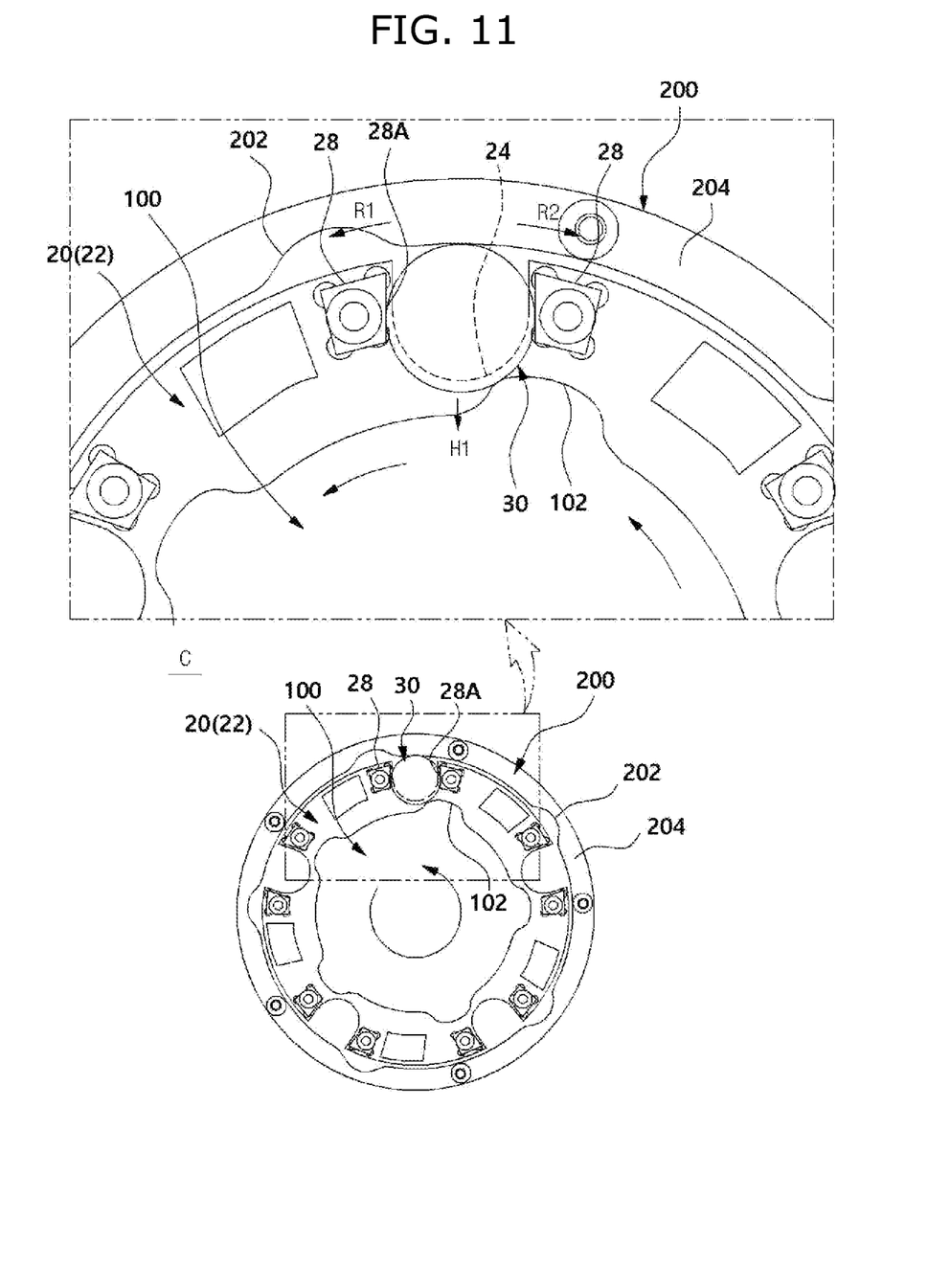
FIG. 11 is a drawing when the driver releases the accelerator pedal from the state shown in FIG. 10.

FIG. 11 is a drawing when the driver releases the accelerator pedal E from the state shown in FIG. 10. The out-cam 200 is positioned where it slightly rotates clockwise R2. Because the out-cam 30 is still positioned on the flat inner surface of the inner rim 204, the out-cam 30 still transmits the torque of the engine Eg as the accelerator pedal E is pressed. In addition, the rotary member 30 remains in contact with the convex surface 102 of the in-cam 100. Thus, compared to FIG. 10, the rotational force of the engine Eg is continuously transmitted to the forked part 20 through the rotary member 30, even though the acceleration of the engine Eg and the rotational force of the in-cam 100 are reduced due to releasing of the accelerator pedal E. The out-cam 200 in contact with the rotary member 30 also keep rotating at the same time.

Figure 12:
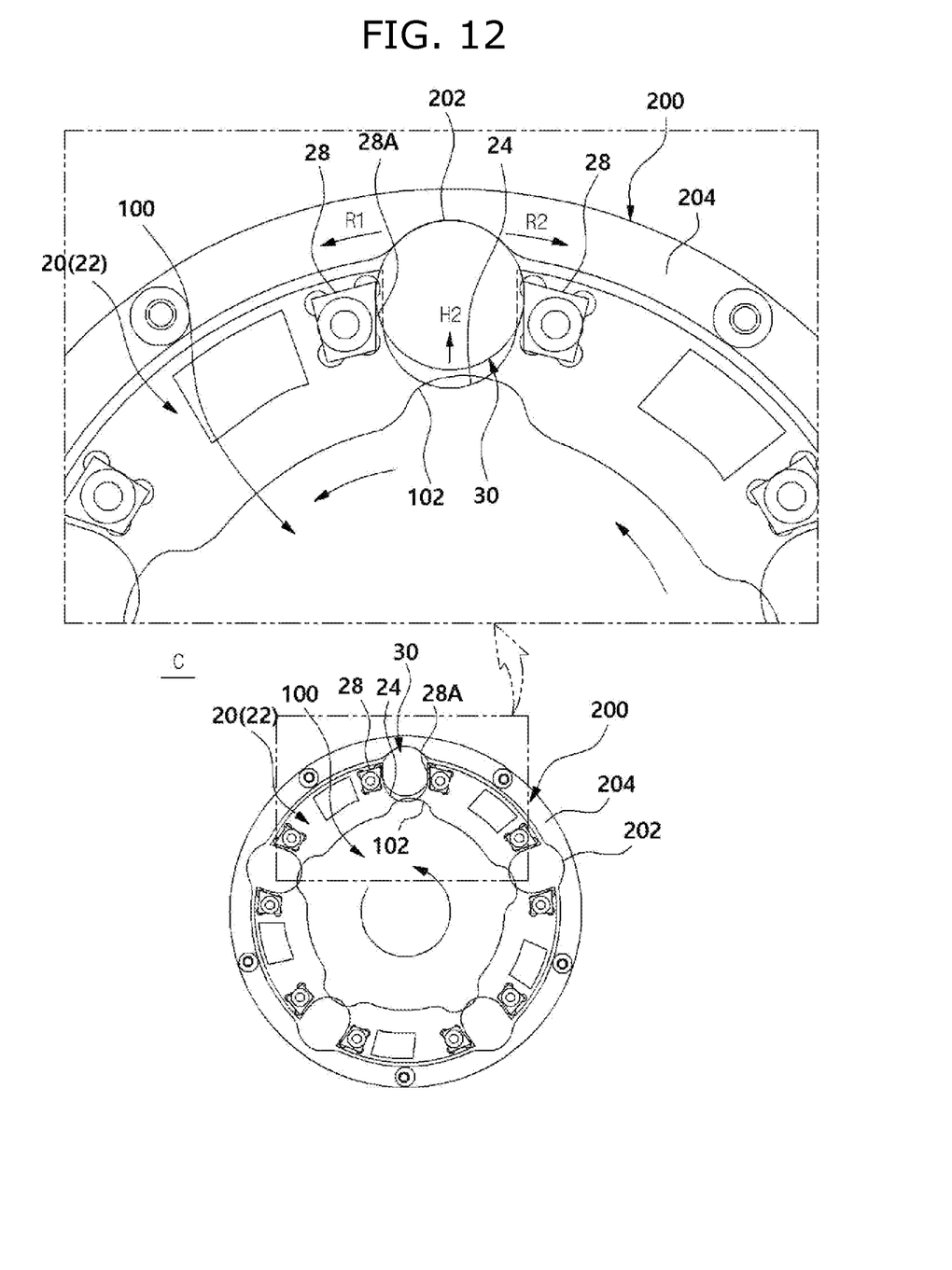
FIG. 12 is a drawing when the driver fully presses the brake pedal from the state shown in FIG. 11.

FIG. 12 is a drawing when the driver fully presses the brake pedal from the state shown in FIG. 11. The out-cam 200 further rotates clockwise R2 so that the rotary member 30 moves up to comes in contact with the apex of the receptive surface 202 as shown in FIG. 12, and is spaced apart from the convex surface 102 of the in-cam 100 with a fine distance. Therefore, power from the engine Eg is not transmitted to the transmission Tr.

It can be understood that when the brake pedal B is slowly pressed from the state of FIG. 11, the clutch assembly C changes its state towards FIG. 12. In other words, the rotary member 30 is initially in contact with the in-cam 100, but by its centrifugal force, the rotary member 30 begins to enter the receptive surface 202 of the out-cam 200 again, moving up vertically in the upward direction H2. Accordingly, the contact area between the rotary member 30 and the in-cam 100 gets narrower. As soon as the rotary member 30 reaches the apex of the receptive surface 202, the rotary member 30 is completely received in the receptive surface 202, and spaced apart from the in-cam as shown in FIG. 12.

Figure 13:
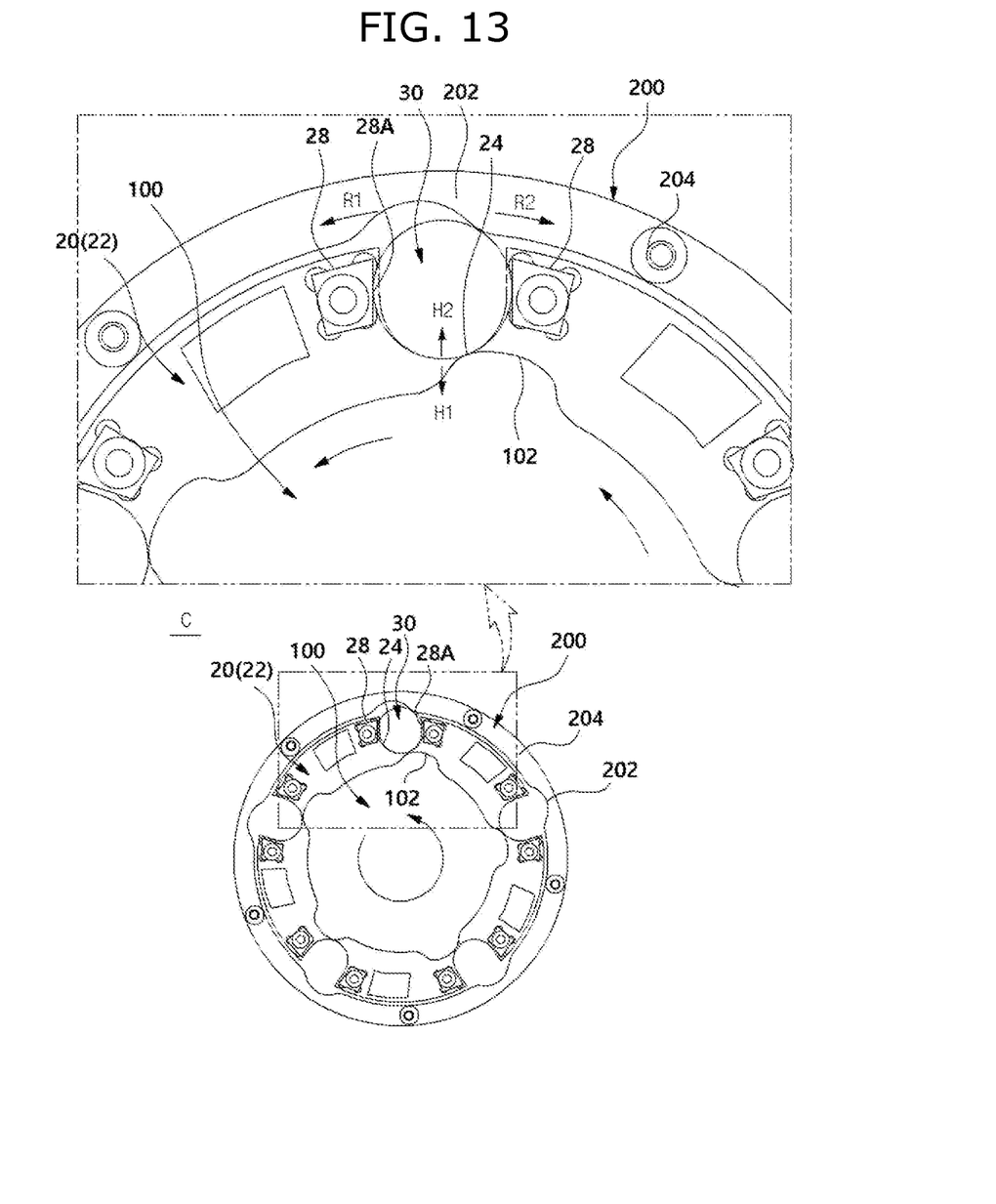
FIG. 13 is a drawing when the driver releases the brake pedal from the state shown in FIG. 12.

FIG. 13 is a drawing when the driver releases the brake pedal B from the state shown in FIG. 12. From the state shown in FIG. 12, the out-cam 200 rotates slightly counterclockwise R1, but the rotation distance is smaller than that of FIG. 10 because the accelerator pedal E is not pressed. In this instance, the out-cam 200 rotates until the rotary member 30 is located near the boundary between the receptive surface 202 and the flat surface of the inner rim 204. Then, the rotary member 30 gradually moves in the downward direction H1 and reaches to the position where the rotary member 30 comes to contact with the convex surface 102 of the in-cam 100 as illustrated in FIG. 13. This is the aforementioned semi-clutch state, "the fourth state", which is the initial, unstable state of transmission of the rotational force of the engine Eg to the transmission Tr. As such, without a clutch pedal, the present invention can implement "a transitional state" or "intermediate state" used in manual transmission vehicles. This is a feature of the clutch assembly C of the present invention.

Referring to FIGS. 10 to 13 again, when the driver starts pressing the brake pedal B to drive the vehicle, releases the brake pedal B, and then presses the accelerator pedal E, the clutch assembly C of the present invention sequentially becomes in states shown in FIGS. 12, 13, and 10. While driving, the clutch assembly C is located at any states described in FIGS. 10 and 11, depending on the degree to which the driver presses the accelerator pedal E or brake pedal B. In this case, it is important that the engine Eg and the transmission Tr are always in the state of power connection. The change of driving speed of the vehicle is determined by the change in rotation of the engine Eg, and is independent of the clutch assembly C itself.

The clutch assembly C described above can be modified as various forms. The forked part 20 may omit the fork 28 as long as the forked part 20 can clip and support the rotary member 30. The number and shape of rotary member 30 can be various, and other components other than a needle bearing can be used as long as they can be moved in the height direction between the in-cam 100 and the out-cam 200. In addition, a fastening member may be used to secure the fork 28 to the rim so as to firmly support the rotary member 30.

While embodiments of the present invention have been described, the present invention is not limited to what has been particularly shown.

What is claimed is:

1. A clutch assembly comprising:
    an out-cam operatively connected to an accelerator pedal and a brake pedal of a vehicle and rotating in one direction or the other direction;
    an in-cam rotating according to rotation of an engine of the vehicle;
    rotary members contacted with the out-cam and selectively contacted with the in-cam by moving in a height direction according to rotation in one direction or the other direction of the out-cam, and
    a forked part supporting the rotary members and rotating in conjunction with the rotary members,
    wherein a rotational force of the engine is sequentially transmitted through the in-cam, the rotary members, and the forked part.

2. The clutch assembly of claim 1, wherein the forked part includes a pair of forked plates facing each other, and the rotary members are installed to be supported in a space between the forked plates at equal intervals, wherein the in-cam is a disk with a diameter that is smaller than that of the forked part, and the out-cam is a disk with a diameter that is larger than that of the forked part,
    wherein the out-cam and the in-cam are installed in an empty space between the forked plates.

3. The clutch assembly of claim 2, wherein on the outer circumference of the forked plate, concave curved parts are formed at regular intervals, and connection parts connect between the concave curved parts,
    wherein on both sides of the connection part, forks are installed, and the rotary members are contacted with and supported by both sides of the forks.

4. The clutch assembly of claim 1, wherein the out-cam has a rim formed on an outer circumference thereof, and the rim has curved receptive surfaces that are formed on an inner side thereof and that receive the rotary members.

5. The clutch assembly of claim 4, wherein the in-cam has curved convex surfaces protruding outward on an outer circumference thereof, and the curved convex surfaces are formed corresponding to the rotary members.

6. The clutch assembly of claim 5, wherein according to rotation in one direction or the other direction of the out-cam, the rotary members are received in the receptive surfaces, or escaped from the receptive surfaces and placed on flat surfaces of the inner side of the rim, thereby changing locations of the rotary members in the height direction,
    wherein according to the change of the locations of the rotary members in the height direction, the rotary members are either in a state of contact with the convex surfaces or in a state of separation from the convex surfaces.

* * * * *